United States Patent [19]

Featherstone et al.

[11] Patent Number: 4,728,438

[45] Date of Patent: Mar. 1, 1988

[54] PROCESS FOR REDUCING THE CONCENTRATION OF SUSPENDED SOLIDS IN CLARIFIED GEOTHERMAL BRINE

[75] Inventors: John L. Featherstone; Stefan T. Spang, both of El Centro; David G. Newell, Palm Desert, all of Calif.

[73] Assignee: Union Oil Company of California, Los Angeles, Calif.

[21] Appl. No.: 814,099

[22] Filed: Dec. 27, 1985

[51] Int. Cl.[4] ............................................. C02F 1/56
[52] U.S. Cl. .................................. 210/713; 210/714; 210/734; 210/747; 60/641.2; 60/641.5
[58] Field of Search ............... 210/713, 714, 723, 726, 210/727, 728, 729, 734, 747; 60/641.2, 641.5

[56] References Cited

U.S. PATENT DOCUMENTS

| | | | |
|---|---|---|---|
| 2,668,144 | 2/1954 | Joos | 210/713 |
| 3,479,282 | 11/1969 | Chamot et al. | 210/734 |
| 3,680,698 | 9/1972 | Liu et al. | 210/710 |
| 3,728,253 | 4/1973 | Kaufman | 210/624 |
| 4,055,494 | 10/1977 | Emmett, Jr. | 210/715 |
| 4,302,328 | 11/1981 | Van Note | 210/714 |
| 4,304,666 | 12/1981 | Van Note | 210/197 |
| 4,309,291 | 1/1982 | Probstein et al. | 210/713 |
| 4,370,858 | 2/1983 | Awerbuch et al. | 210/747 |
| 4,428,200 | 1/1984 | McCabe et al. | 165/45 |
| 4,429,535 | 2/1984 | Featherstone et al. | 60/641.5 |
| 4,536,294 | 8/1985 | Guillet et al. | 210/734 |
| 4,588,508 | 5/1986 | Allenson et al. | 210/734 |

OTHER PUBLICATIONS

A Cost-Effective Treatment System for the Stabilization of Spent Geothermal Brines, Featherstone, et al. (publication date unknown).

Stabilization of Highly Saline Geothermalbrines, Featherstone, et al., SPE report No. 8269 (undated).

Primary Examiner—Peter Hruskoci
Assistant Examiner—Jeffrey W. Peterson
Attorney, Agent, or Firm—Walter A. Hackler; Howard R. Lambert

[57] ABSTRACT

A process for reducing the concentration of fine, residual solids still remaining suspended in clarified geothermal brine overflow from a primary brine clarification stage in which hot, flashed, silica-rich geothermal brine, containing suspended silicious material, is gravity separated, comprises flowing the brine overflow from the primary clarification stage into a closed secondary clarifier vessel having an internal reaction well. Capacity of the secondary clarifier vessel provides a brine residence time in the vessel of between about 45 and about 150 minutes, the brine residence time in the reaction well being between about 10 and about 20 minutes. Brine in the vessel is blanketed with steam flashed from the brine to exclude air from the vessel. In the reaction well, the brine is contacted with a flocculating agent, preferably a cationic polyacrylamide having a molecular weight of at least about 1 million, in an amount of between about 0.25 and about 2 parts per million. An underflow slurry of silicious material and brine is discharged from the bottom of the vessel, an amount of such underflow slurry is recirculated back into the reaction well causing the solids concentration in the well to be between about 0.5 and about 3 weight percent. A secondarily clarified brine overflow from the secondary clarifier vessel has a concentration of fine, silicious material remaining suspended therein that is substantially reduced over the concentration of such material suspended in the brine overflow from the primary clarification stage.

23 Claims, 5 Drawing Figures

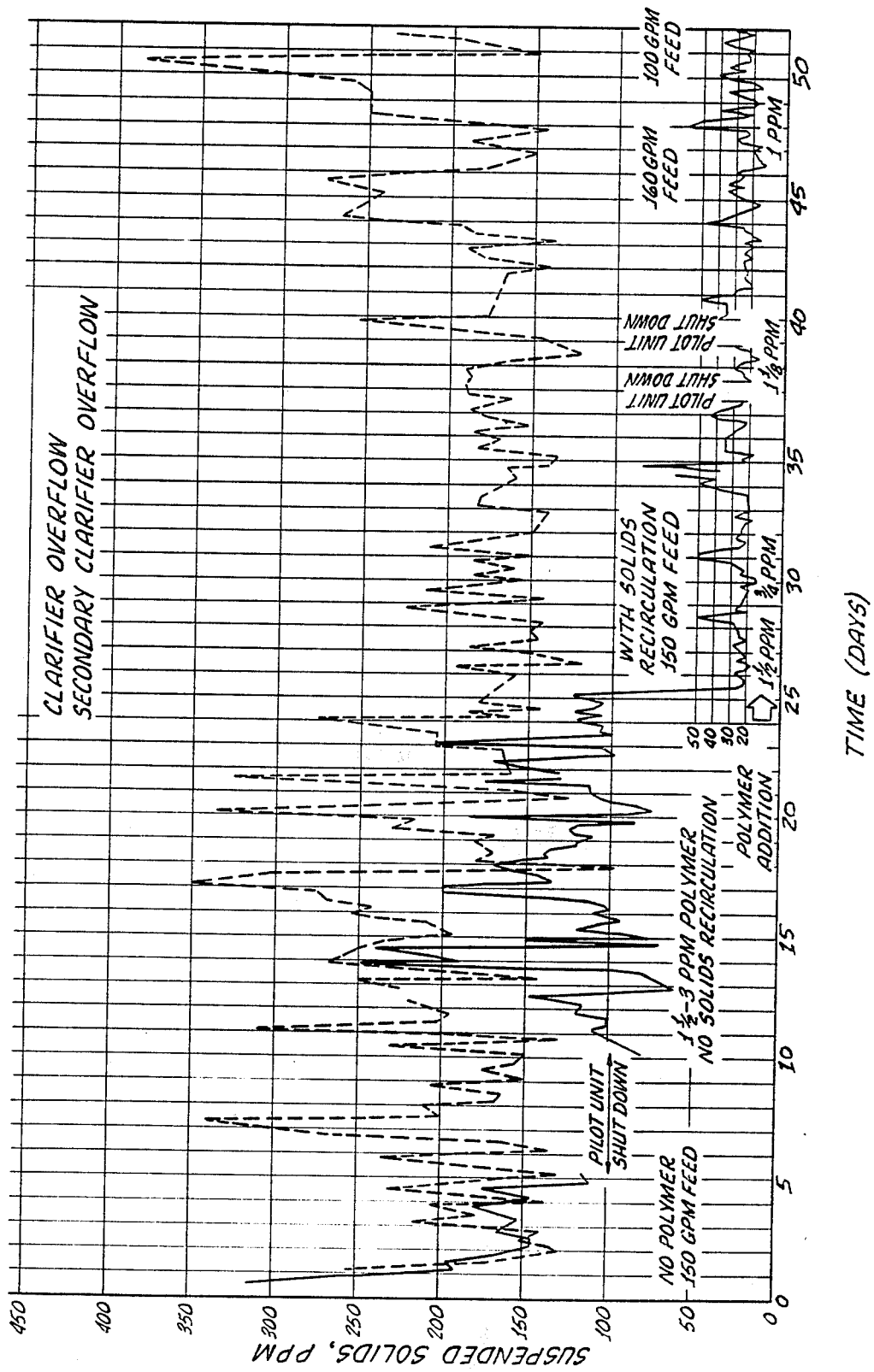

PROCESS FOR REDUCING THE CONCENTRATION OF SUSPENDED SOLIDS IN CLARIFIED GEOTHERMAL BRINE

BACKGROUND OF THE INVENTION

1. Field of the Invention

The present invention relates generally to the production of steam from geothermal brine and especially to processes for clarifying flashed, silica-rich geothermal brine before the reinjection thereof into the ground.

2. Discussion of the Prior Art

Large subterranean aquifers of naturally produced (geothermal) steam or hot aqueous liquids, specifically water or brine, are found throughout the world. These aquifers, which often have vast amounts of energy potential, are most commonly found where the earth's near-surface thermal gradient is abnormally high, as evidenced by unusually great volcanic, fumarole or geyser activity. Thus, as an example, geothermal aquifers are fairly common along the rim of the Pacific Ocean, long known for its volcanic activity.

Geothermal steam or water has, in some regions of the world, been used for centuries for therapeutic treatment of physical infirmities and diseases. In other regions, such geothermal fluids have long been used to heat dwellings and in industrial processes. Although efforts to further develop geothermal resources for these site-restrictive uses continue, considerable recent research and development has, additionally, been directed to exploitation of geothermal resources for production of electrical power which can be conducted, often over existing power grids, for long distances from the geothermal sources. In particular, recent steep increases in the cost of petroleum products used for conventional production of electric power, as well as actual or threatened petroleum fuel shortages or embargos have intensified the interest in use of geothermal fluids as an alternative and generally self-renewing source of power plant "fuel."

General processes by which geothermal fluids can be used to generate electric power are known and have been known for some time. As an example, geothermal steam, after removal of particulate matter and polluting gases, such as hydrogen sulfide and ammonia, can be used in the manner of boiler-generated steam to operate steam turbine generators.

Naturally pressurized geothermal brine or water having a temperature of over about 400° F. can be flashed to a reduced pressure to convert some of the brine or water to steam. The steam produced in this manner can then be used to drive steam turbine generators. The flashed geothermal liquid and the steam condensate obtained from power generation are typically reinjected into the ground to replenish the aquifer and prevent ground subsidence. Cooler geothermal brine or water can often be used to advantage in binary systems in which a low-boiling point, secondary liquid is vaporized by the hot geothermal liquid, the vapor produced being used to operate gas turbine generators. The cooled brine is typically reinjected into the ground.

As might be expected, use of geothermal steam is preferred over use of geothermal water or brine for generating electric power because the steam can be used more directly, easily and cheaply. Consequently, where readily and abundantly available, geothermal steam has been used for a number of years to generate commercially important amounts of electric power at favorable costs. For example, by the late 1970's, geothermal steam at The Geysers in Northern California was generating about two percent of all the electricity used in California.

While energy production facilities at important geothermal steam sources, such as at The Geysers, are generally still being expanded, the known number of important geothermal steam aquifers is small compared to that of geothermal brine or water. Current estimates are, in fact, that good geothermal brine or water sources are about five times more prevalent than are good sources of geothermal steam. The potential for generating electric power is, therefore, much greater for geothermal brine and water than it is for geothermal steam. As a result, considerable current geothermal research is understandably directed towards the development of economical geothermal brine and water electric power generating plants, much of this effort being expended towards use of vast geothermal brine resources in the Imperial Valley of southern California.

Although, as above mentioned, general processes are known for using geothermal brine or water for production of electric power, serious problems, especially with the use of highly saline geothermal brine, have often been encountered in practice. These problems have frequently been so great as to prevent the production of electric power at competitive rates and, as a consequence, have greatly impeded the progress of flashed geothermal brine power plant development in many areas.

These severe problems are caused primarily by the typically complex composition of geothermal brines. At natural aquifer temperatures in excess of about 400° F. and pressures in the typical range of 400 to 500 psig, the brine leaches large amounts of salts, minerals and elements from the aquifer formation, the brine presumably being in chemical equilibrium with the formation. Thus, although brine composition may vary from aquifer to aquifer, wellhead brine typically contains very high levels of dissolved silica, as well as substantial levels of dissolved heavy metals such as lead, copper, zinc, iron and cadmium. In addition, many other impurities, particulate matter and dissolved gases are present in most geothermal brines.

As natural brine pressure and temperature are substantially reduced in power plant steam production (flashing) stages, chemical equilibrium of the brine is disturbed and saturation levels of impurities in the brine are typically exceeded. This causes impurities and silica to precipitate from the brine, as a tough scale, onto surrounding equipment walls and in reinjection wells, often at a rate of several inches in thickness per month. Assuming, as is common, that the brine is supersaturated with silica at the wellhead, in high temperature portions of the brine handling system, for example, in the high pressure brine flashing vessels, heavy metal sulfide and silicate scaling typically predominates. In lower temperature portions of the system, for example, in atmospheric flashing vessels, amorphous silica and hydrated ferric oxide scaling has been found to predominate. Scale, so formed, typically comprises iron-rich silicates, and is usually very difficult, costly and time consuming to remove from equipment. Because of the fast growing scale rates, extensive facility down time for descaling operations may, unless scale reducing processes are used, be required. Associated injection wells may also require frequent and extensive rework and new injection wells may, from time to time, have to be drilled at great cost.

Therefore, considerable effort has been, and is being, directed towards developing effective processes for eliminating, or at least very substantially reducing, silica scaling in flashed geothermal brine handling systems. One such scale reduction process, disclosed in U.S. Pat. No. 4,370,858 to Awerbuck, et al, involves the induced precipitation of scale-forming materials, notably silica, from the brine in the flashing stage by contacting the flashed brine with silica or silica-rich seed crystals. When the amount of silica which can remain in the brine is exceeded by the brine being flashed to a reduced pressure, silica leaving solution in the brine deposits onto the seed crystals. Not only do the vast number of micron-sized seed crystals introduced into the flashing stage provide a very much larger surface area than the exposed surfaces of the flashing vessels but also the silica from the brine tends to preferentially deposit onto the seed crystals for chemical reasons. Substantially all of the silica leaving the brine therefore precipitates onto the seed crystals instead of precipitating as scale onto vessel and equipment walls and in injection wells.

Preferably, the seed crystals are introduced into the high pressure flashing vessel, or crystallizer, wherein high pressure, two phase brine is separated. The silica removal or crystallization process, although commencing in the high pressure flash crystallizer, continues in successive, lower pressure flashing vessels in which additional two phase brine separation occurs. In a downstream reactor-clarifier, the silicious precipitate is separated from the brine as a slurry which may contain about 30 percent by weight of silica. According to known processes, a portion of this silicious slurry from the reactor-clarifier stage is recirculated back upstream into the high pressure flash crystallizer, wherein the silica material in the slurry acts as seed material.

For such reasons as aquifer replenishment and avoiding ground subsidence, the brine overflow from the reactor-clarifier, as well as steam condensate from the electric power generating facility, is usually pumped back into the ground through deep injection wells. Typically, however, the clarified brine from the reactor-clarifier still contains too high a concentration of residual suspended solids to be reinjected without causing problems in the injection wells. Although the reactor-clarifier is ordinarily efficient in removing the bulk of the silicious solids contained in the brine. when discharged from the flash crystallization stage, the brine still contains many suspended particles which are too fine to settle out in the reactor-clarifier. The concentration of these fine particles in the brine overflow from the reactor-clarifier is frequently sufficient to cause plugging of the injection wells at an excessive rate. Therefore, absent further treatment of the clarified brine, costly injection well rework and/or the costly drilling of new injection wells may be so frequently required that electric power production by the brine becomes uneconomical.

Consequently, to protect injection wells, a clarified brine filtration stage is usually provided between the reactor-clarifier and the injection wells. When properly functioning, the brine filtration stage, which typically comprises one or more media filters, reduces the residual suspended solids concentration in the brine to acceptable injection levels, it being appreciated that tradeoffs generally exist between the cost of increasing filter effectiveness and the cost of occasional injection well rework.

By way of illustrative example, it has been found that the clarified brine overflow from the reactor-clarifier may in some instances have a residual suspended solids concentration of about 150 parts per million, with a mean particle size of between about 4 and about 5 microns. By effective filtering of the clarified brine, the residual suspended solids concentration may be reduced to about 10 or 15 parts per million, with a mean particle size of between about 3 and about 4 microns. Such solids concentrations after brine filtering appear not to cause an excessive amount of damage to brine injection wells and are generally considered acceptable.

Although it is generally possible, by filtering, to attain such a reduced residual suspended solids content in previously clarified brine, the filtering process has itself typically been found to create new and serious problems in the brine handling system. For filters to be effective in filtering the brine, they must, of course, remove substantial amounts of the residual solids concentration from the brine. These removed materials accumulate in the filters and must periodically be removed for filter efficiency to be maintained. However, it has been the general experience that the fine silicious particles removed by the filters from the clarified brine are very sticky or cohesive in nature and tend rapidly to agglomerate in the filters into sizeable clumps of material commonly referred to as "mud balls." These mud balls, being larger and more massive than the filter media particles, cannot be easily removed from the filters by conventional backwash procedures. It has, in fact, been found that even with frequent backwashing, the mud balls still form at rates requiring the replacement of the filter media every few months, at considerable cost in terms of media replacement, labor and equipment downtime. Available filters have, moreover, been found to be difficult to repack with filter media.

Frequent filter backwashing, to retard the formation of mud balls in the filters and prolong filter media life, however, creates other problems. For example, to avoid the necessity of power plant shutdown during filter backwashing, which may be required every few hours, otherwise redundant filters must generally be provided at substantial added cost. Moreover, frequent filter backwashing creates problems relating to backwash disposal. Ordinarily, the filters are backwashed, from a backwash holding tank, with filtered brine from the filters. Like the brine itself, the backwash brine must generally be reinjected as the only practical method of disposal, particularly since the material backwashed from the filters may contain excessive amounts of such heavy metals as lead and zinc, thereby making other means of backwash disposal impractical.

However, because of the amount of solids suspended in the backwash brine, direct injection thereof through injection wells is also not practical. It has, therefore, been the usual practice to pond the backwash brine for a period of time during which some of the solids settle from the brine, and them to pump the brine, still containing suspended solids, back upstream, for example, into the atmospheric flash vessel for recombination with the main flow of brine upstream of the reactor-clarifier stage. However, the additional fine solids suspended in the backwash brine tends to upset the brine-solids separation process in the reactor-clarifier, thereby causing the clarified brine overflow from the reactor-clarifier to have higher than normal concentrations of suspended solids, in turn, overloading the filters and accelerating the formation of mud balls in the filters. Furthermore, the ponding of the backwash brine before the combining thereof with the main flow of brine causes the brine backwash to become more acidic, due principally to the air oxidation of ferrous ions naturally present in the brine to ferric ions. As a result, brine handling equipment corrosion is typically increased.

As a result of these and other filtering stage problems, the economical production of electric power by use of silica-rich geothermal brine may still be jeopardized and improved processes for the pre-injection treatment of clarified brine are clearly needed.

It is, therefore, an object of the present invention to provide a process for the secondary clarification of geothermal brine prior to the reinjection thereof into the ground.

Another object of the present invention is to provide a geothermal brine secondary clarification process utilizing flocculants and the recirculation of brine underflow from the secondary clarification process.

Other objects, advantages and features of the present invention will become apparent to those skilled in the art from the following description, when taken in conjunction with the accompanying drawings.

SUMMARY OF THE INVENTION

According to the present invention, there is provided a process for reducing the concentration of residual solids suspended in geothermal brine overflow from a primary brine clarification stage in which a mixture of hot, flashed silica-rich geothermal brine and suspended silicious material is separated so as to provide a silicious sludge, the geothermal brine overflow having a residual amount of solids still remaining suspended therein. The process comprises flowing the geothermal brine overflow from the primary brine clarification stage into a secondary clarifier vessel and contacting the brine overflow from the primary brine clarification stage in the secondary clarifier vessel with a flocculating agent. Included in the process is the discharging from the secondary clarifier vessel of an underflow of flocculated solids and brine, the combining of a portion of the underflow of flocculated solids and brine with the brine overflow from the primary brine clarification stage so that a preestablished solids concentration is provided in regions of the secondary clarifier vessel in which the flocculating agent and brine are contacted and the discharging from the secondary clarifier vessel of a secondarily clarified brine overflow in which the concentration of residual suspended solids is substantially reduced over the concentration of residual solids suspended in the brine overflow from the primary clarification stage.

The secondary clarifier vessel preferably has closed upper regions, the process then including blanketing the geothermal brine in the vessel with steam, so as to exclude air therefrom, oxidation of ferrous ions naturally contained in the brine being thereby prevented while the brine is in the vessel. In one embodiment, the brine in the secondary clarifier vessel is blanketed with steam obtained from the upstream flashing of the brine, thereby assuring brine-steam compatibility.

It is preferred that the secondary clarifier vessel has an internal mixing well, the process then including introducing the brine overflow from the primary brine clarification stage into the reaction well and contacting the brine with the flocculating agent in such reaction well. To provide for rapid, efficient flocculation of residual solids suspended in the brine overflow from the primary brine clarification stage, an amount of the flocculated solids and brine underflow from the secondary clarifier vessel is combined with the brine overflow from the primary brine clarification stage to provide a solids concentration in the reaction well which is preferably between about 0.5 and about 3 weight percent and which is more preferably about 1.5 weight percent.

Such combining, in the secondary clarifier vessel, of part of the flocculated solids and brine underflow from such vessel with the brine overflow from the primary brine clarification stage importantly provides a greatly increased "target" area for the unflocculated suspended solids from the primary clarifier to contact and coagulate. As a consequence, the effectiveness of the flocculating process is greatly enhanced over the use of a flocculating agent in the absence of flocculated solids and brine underflow recirculation.

According to the preferred embodiment, the secondary clarification vessel provides a geothermal brine residence time in the vessel of at least about 45 minutes and preferably between about 45 and about 150 minutes. Also, in the preferred embodiment, the process step of contacting the geothermal brine overflow from the primary brine clarification stage with a flocculating agent includes adding an amount of flocculating agent to the brine of between about 0.25 and about 2 parts per million and more preferably between about 0.75 and about 1.25 parts per million. Moreover, it is preferred that the flocculating agent be added to the brine overflow from the primary brine clarification stage before the brine overflow is introduced into the secondary clarification vessel.

Still further, it is preferred that the flocculating agent be selected as a cationic polyacrylamide, having a molecular weight of at least about one million and more preferably of at least about 16 million.

In one instance, the concentration of silicious solids or particles remaining suspended in the brine overflow from the primary brine clarification stage may be between about 100 and about 300 parts per million; whereas, the concentration of such particles in the secondarily clarified brine overflow from the secondary clarifier vessel may be between about 20 and about 50 parts per million.

BRIEF DESCRIPTION OF THE DRAWINGS

The present invention will be more readily understood by reference to the drawings in which:

FIG. 3 is a graph in which the residual solids concentration (in parts per million) in geothermal brine is plotted both for clarified brine and for further treated brine against time during which various secondary clarification treatments are applied to the further treated brine, the graph showing the relative effects of such different secondary clarification treatments in reducing the residual solids concentration in clarified brine.

DESCRIPTION OF THE PREFERRED EMBODIMENT

The present, secondary brine clarification process for pre-injection treatment of clarified geothermal brine can be better understood by first considering an exemplary, preexisting-type of geothermal brine electrical power plant which incorporates a conventional, pre-injection brine filtering stage, and by then considering another exemplary geothermal brine electrical power plant which utilizes, in place of the brine filtering stage, a secondary brine clarification stage in accordance with the present invention.

Figure 1A:
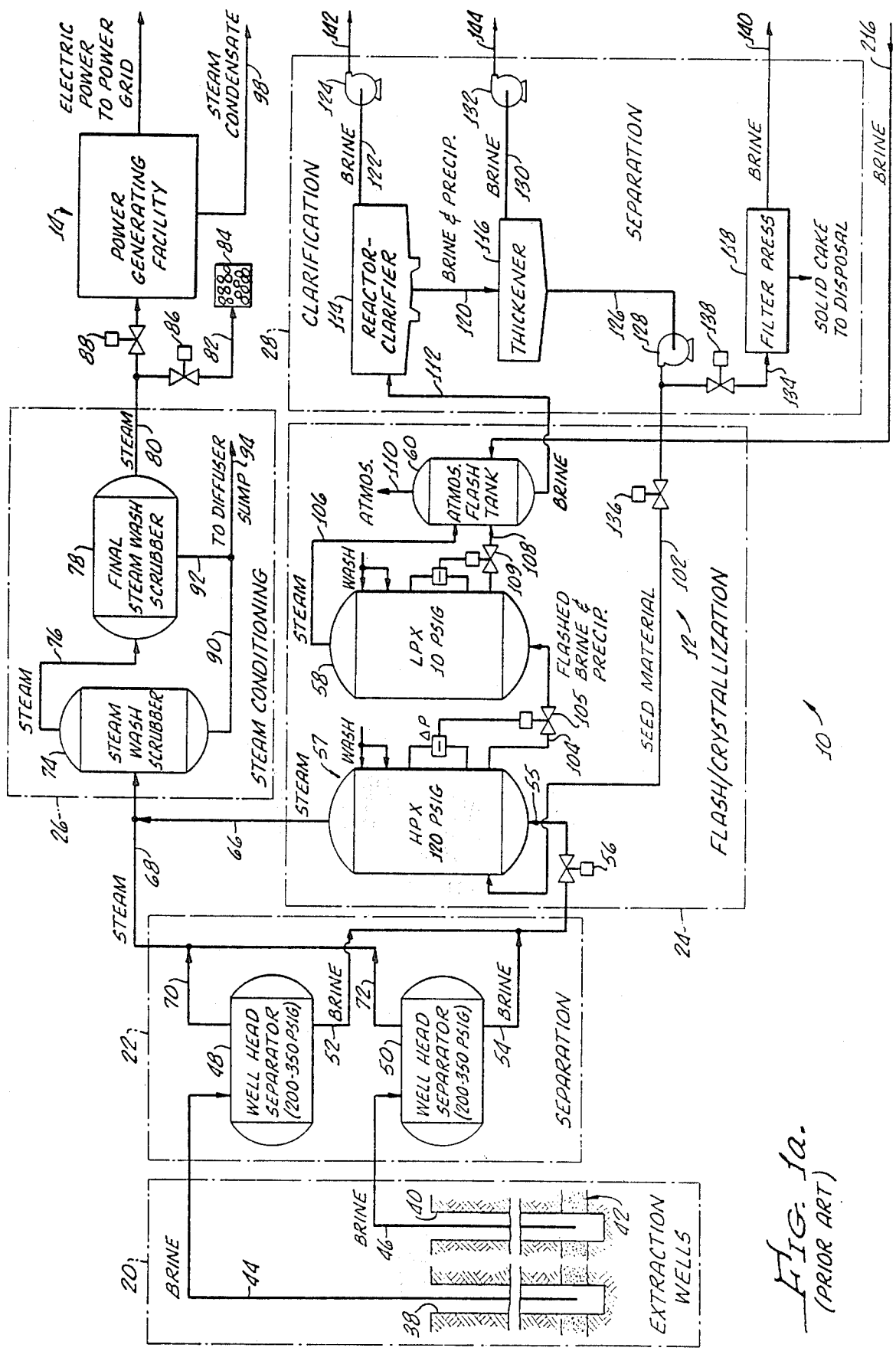
FIG. 1 is a simplified diagram of an exemplary, preexisting geothermal brine electrical power plant incorporating a conventional, pre-injection brine filtering stage, FIG. 1a showing one part of the power plant and FIG. 1b showing the remainder of the power plant.
Figure 1B:
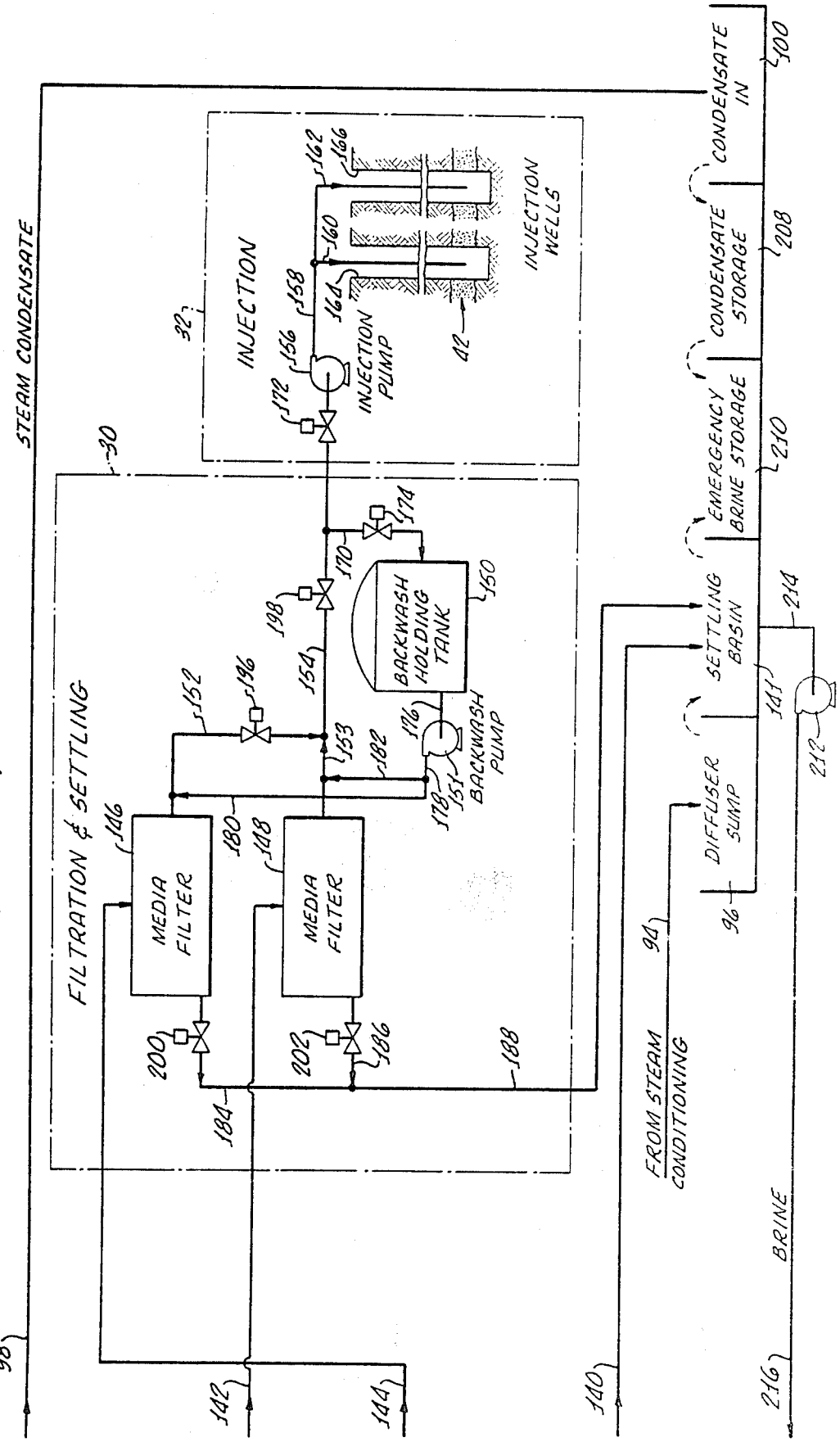

Shown, therefore, in simplified form in FIGS. 1a and 1b is an exemplary, conventional geothermal power plant 10, which comprises a brine handling portion 12 and an associated electric generating portion 14.

The function of brine handling portion 12 is the extraction of hot, pressurized, geothermal brine from the ground, the conversion, by a brine flashing process, of some of the brine into steam, and the reinjection of the flashed brine and of steam condensate (if any) returned from power generating portion 14. In turn, the function of power generating portion 14 is to use the steam provided by brine handling portion 12 for the production of electric power, for example, by using the steam to drive a steam turbine generator, not shown.

Comprising generally, brine handling portion 12 are brine extraction stage 20 (FIG. 1a), a wellhead separation stage 22, a steam production (flashing) and silica crystallization stage 24, a steam conditioning stage 26, a brine clarification stage 28, a brine filtering stage 30 (FIG. 1b), which the present invention replaces, and a brine injection stage 32.

More specifically, brine extracting stage 20, as shown in FIG. 1a, includes first and second geothermal brine extraction wells 38 and 40, by means of which geothermal brine is extracted from a common underground aquifer 42. At the wellhead, the geothermal brine contains liquid and vapor phases and may have a temperature of between about 400° F. and about 600° F. and be at a natural pressure of between about 250 psig and about 500 psig, a typical wellhead temperature and pressure being about 450° F. and about 450 psig. At the mentioned high temperature and pressure, the geothermal brine dissolves substantial amounts of minerals and elements from aquifer formation 42. In particular, the brine normally contains considerable dissolved salts (hence, the term "brine") and is typically saturated with silica. Moreover, the brine as extracted may contain appreciable amounts of dissolved elements such as lead, zinc, copper, iron, cadmium, silver, mangenese, arsenic and antimony. Gases such as hydrogen sulfide, ammonia and carbon dioxide may be intermixed with the brine. Geothermal brines thus ordinarily comprise heavily contaminated water and may typically have wellhead pHs of about 5 to 5.5, being thereby slightly acidic.

From wells 38 and 40, the two phase brine is fed, through conduits 44 and 46, to respective first and second wellhead separators 48 and 50 which comprise separator stage 22 (FIG. 1a). In wellhead separators 48 and 50, steam and such non-condensable gases as hydrogen sulfide and ammonia, which are mixed with the brine, are separated from the brine.

From wellhead separators 48 and 50, the liquid brine is fed through respective conduits 52 and 54, a common conduit 55 and a flashing valve 56 into the bottom of a high pressure flash crystallizer (HPX) 57, which together with a low pressure flash crystallizer (LPX) 58 and an atmospheric flash vessel 60, principally comprise steam production (flashing) and silica crystallization stage 24. Across flashing valve 56 the brine is flashed to a reduced pressure of, for example, about 120 psig, so as to convert part of the brine into steam. Within high pressure flash crystallizer 57, the two phase brine is separated. As an illustration, for a brine flow of about 1.3 million pounds of about 450° F. and 450 psig brine per hour, about 95,000 pounds of 120 psig of steam may be produced. Such produced steam is discharged from high pressure flash crystallizer 57, through a conduit 66, into a common steam discharge conduit 68 which also receives steam, through respective conduits 70 and 72, from wellhead separators 48 and 50. Conduit 66 discharges into a first steam scrubber 74, from which steam is discharged through a conduit 76 to a second (final) steam scrubber 78. Clean steam is discharged from second scrubber 78, through a conduit 80, to power generating portion 14.

In the event the quality of steam discharged through conduit 80 from second scrubber 78 does not meet power generation requirements, for example, as to the level of total dissolved solids (TDS), the steam may be vented from conduit 80, through a conduit 82, to an atmospheric vent apparatus 84. Valves 86 and 88 in respective conduits 82 and 80 control the direction of flow of the steam from second scrubber 78.

Wash water from first and second steam scrubbers 74 and 78 is discharged, through respective conduits 90 and 92 and a common conduit 94, for example, to a diffuser sump 96 (FIG. 1b). Condensed steam is returned from power generating portion 14, through a conduit 98 to a "condensate in" vessel 100 in steam generating portion 12 (FIG. 1b) for subsequent disposal, as described below.

Silicious seed material is fed, also as described below, through a conduit 102, into high pressure flash crystallizer 57 from brine clarification stage 28. Within crystallizer 57, silica from the brine, which is typically supersaturated in silica as a result of reduced brine temperature and pressure, preferentially deposits or crystallizes (with other impurities) from the brine onto the seed material as a silicious deposit, the brine and seed material being circulated in crystallizer 57 to enhance the seeding process.

From high pressure flash crystallizer 57, liquid brine and suspended silicious material are flowed through a conduit 104 and a flashing valve 105 into the bottom of low pressure flash crystallizer 58. Across flashing valve 105, the brine is flashed to a further reduced pressure, for example, about 10 psig, to convert additional brine into steam, the two phase brine being fed into low pressure flash crystallizer for separation. For the exemplary brine flow rate mentioned above, the amount of steam separated in low pressure flash crystallizer 58 may also be about 95,000 pounds per hour. Such additional steam, which has relatively low energy content, may be discharged from low pressure crystallizer 58 through a conduit 106 into atmospheric flash vessel 60. Within low pressure flash crystallizer 58, additional silica may be deposited from the brine onto the silica particles entrained in the brine. From crystallizer 58, brine and the entrained silicious material are flowed through conduit 108. Across a third flashing valve 109 in conduit 108, the brine is flashed to atmospheric pressure so as to create still more steam, such steam being separated from the two phase brine in vessel 60. Typically, the steam is discharged from vessel 60 through a conduit 110 into the atmosphere, but may alternatively be used for other purposes, for example, facility heating. Silica crystallization from the brine onto the suspended silicious material continues to some extent in atmospheric flash vessel 60.

Brine and the entrained silicious material are discharged from vessel 60, through a conduit 112, to a recirculation-type, reactor-clarifier 114 which with a thickener 116 and a filter press 118 comprise brine clarification and stabilization stage 28. Within reactor-clarifier 114, the silicious material carried with the brine is allowed to settle from the brine as a sludge which is removed, with some brine, from the bottom of the reactor-clarifier through a conduit 120. Clarified brine, still containing small amounts, for example, about 150 parts per million (PPM) of silicious particles a few microns in size, is discharged from reactor-clarifier 114 through a conduit 122 to a first filter pump 124. Wet silicious sludge is discharged, through conduit 120, to sludge thickener 116, in which much of the brine is removed from the sludge. De-watered sludge is discharged from thickener 116, through a conduit 126, to a sludge pump 128. The comparatively small amount of brine from thickener 116 is discharged, through a conduit 130, to a second filter pump 132. By way of example, for the above-mentioned approximate 1.3 million pounds per hour brine extraction rate, the clarified brine flow from reactor-clarifier 114 may be about 1.1 million pounds per hour and the brine flow from thickener may be about 70,000 pounds per hour.

Sludge pump 128 pumps part of the silica sludge received through conduit 126 through conduit 102 back upstream into high pressure flash crystallizer 57 as seed material, and the rest of the sludge, through a conduit 134, into filter press 118. Valves 136 and 138, in respective conduits 102 and 134, control flow of sludge from sludge pump 128. Brine from filter press 118 is flowed through a conduit 140 to a settling basin 141 (FIG. 1b). "Dry" sludge, still, however, containing some entrapped brine, is discharged from filter press 118 for additional treatment or disposal. For the mentioned brine extraction rate of about 1.3 million pounds per hour, sludge may be discharged from filter press 118 at a rate of about 500 pounds per hour (about six tons per day).

Filter pumps 124 and 132 pump brine from reactor-clarifier 114 and thickener 116, through conduits 142 and 144, into respective first and second media filters 146 and 148 (FIG. 1b), which with a backwash holding tank 150 and a backwash pump 151 principally comprise brine filtering stage 30.

From filters 146 and 148, filtered brine is flowed through respective conduits 152 and 153, and a common conduit 154, to a brine injection pump 156. Filtered brine is discharged from pump 156, through a common conduit 158 and conduits 160 and 162, into first and second injection wells 164 and 166, respectively, which preferably (as shown) discharge into geothermal brine aquifer 42. Pump 156 and injection wells 164 and 166 comprise injection stage 32.

Within filtering stage 30, filtered brine may be diverted from conduit 154, through a conduit 170, into backwash holding tank 150. Valves 172 and 174 in respective conduits 154 and 170 control the flow of filtered brine from filters 146 and 148. When filters 146 and 148 require backwashing, filtered brine is pumped, by backwash pump 151, through a conduit 176, from holding tank 150 and through a common conduit 178 and conduits 180 and 182 into the filters in a reverse flow direction. Backwash brine is discharged from filters 146 and 148 through conduits 184 and 186, and a common conduit 188 into settling basin 141. Valves 196, 198, 200 and 202 in respective conduits 152, 154, 184 and 186, are provided for controlling brine flow for backwashing purposes. A typical filter backwash may, for example, use about 8500 gallons of brine per filter.

From "condensate in" tank 100, the condensate overflows into a condensate storage vessel or tank 208. An emergency overflow storage pond 210 is in overflow communication between condensate storage vessel 208 and brine settling basin 141. Brine from settling basin 141 may, as shown, be pumped by a brine pump 212, through conduits 214 and 216, back upstream to atmospheric flash vessel 60 for combining therein with brine from low pressure flash crystallizer 58.

It is to be understood that power plant 10 is shown in FIG. 1 merely by way of example and, as such, is shown simplified over an actual power plant which is understandably complex and has a great many valves, conduits, controls and the like not shown or described herein. Also, for example, a practical operating geothermal brine power plant may be expected to have more than the described and shown two extraction wells 38 and 40, the two separators 48 and 50, the two media filters 146 and 148 and the two injection wells 164 and 166.

SECONDARY BRINE CLARIFICATION

Shown in FIG. 2 is an exemplary geothermal brine electric power plant 10a which is generally similar to above-described power plant 10, except that, as shown, brine filtration and settling stage 30 of power plant 10 has been replaced by a secondary brine clarification stage 300 in accordance with the present invention. In power plant 10a of FIG. 2, elements and features which are the same as those above-described for power plant 10 of FIG. 1 retain the same reference number. Elements and features which correspond generally to those previously described are given, in FIG. 2, the same reference number previously used followed by an "a." New elements and features appearing for the first time in FIG. 2, are given new reference numbers, starting with the reference number 300.

Figure 2A:
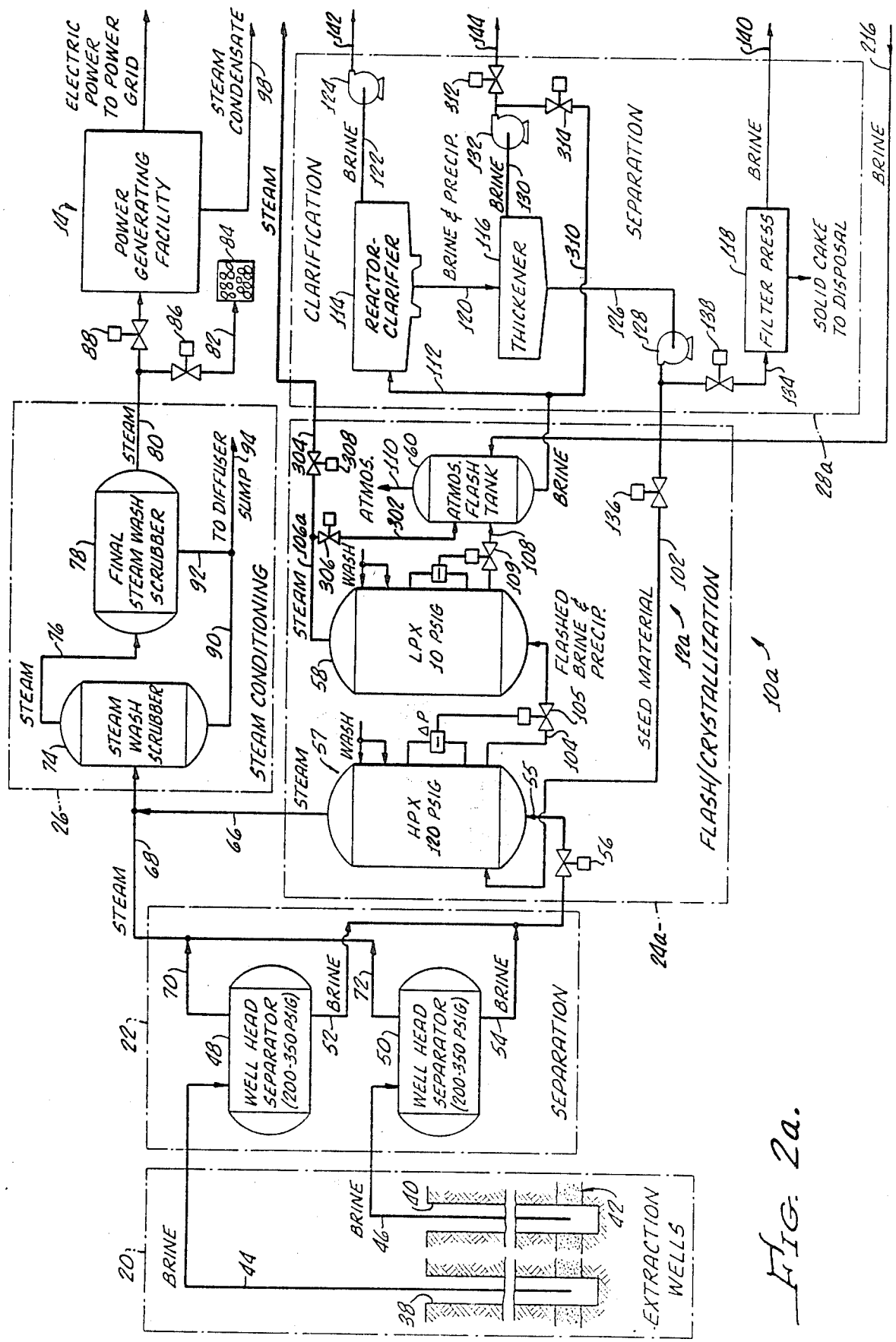
FIG. 2 is a simplified diagram of an exemplary, geothermal brine electrical power plant which incorporates a secondary brine clarification stage, according to the present invention, FIG. 2a showing one part of the power plant and FIG. 2b showing the remainder of the power plant.
Figure 2B:
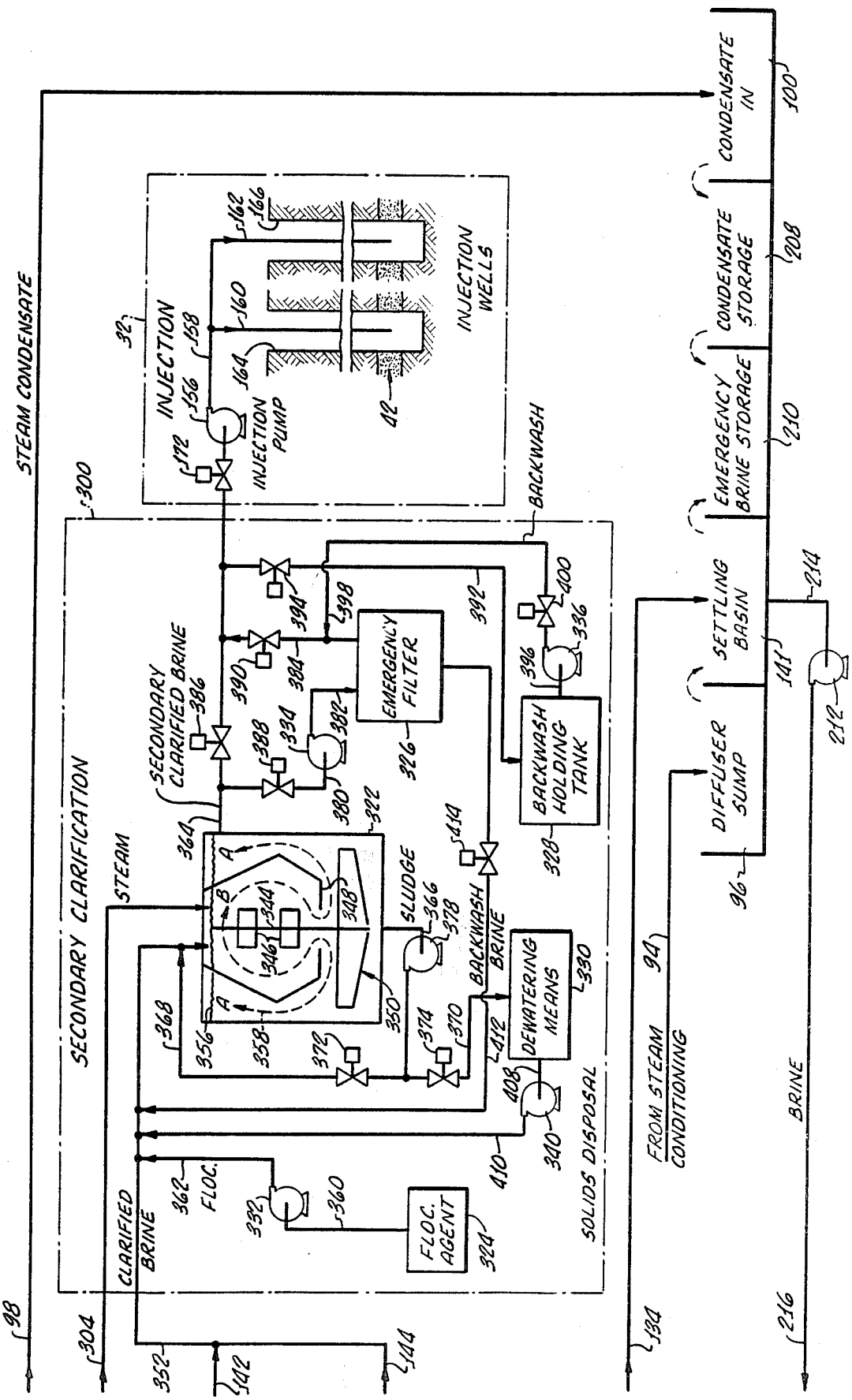

Power plant 10a is shown in FIG. 2 to comprise generally a brine handling portion 12a and power generating portion 14. Comprising brine handling portion 12a are brine extraction stage 20, wellhead separation stage 22, a flash crystallization stage 24a, steam conditioning stage 26, a brine clarification and separation stage 28a, secondary brine clarification stage 300, according to the present invention, (FIG. 2b) and brine injection stage 32.

The shown difference between flash crystallization stage 24a (FIG. 2a) and corresponding flash crystallization stage 24 (FIG. 1a) described above is that in stage 24a, only a portion, instead of all, of the steam produced in lower pressure flash crystallizer 58 is flowed into atmospheric flash vessel 60. As shown in FIG. 2a, part of the steam produced in low pressure flash crystallizer 58 is flowed, through conduits 106a and 302 into atmospheric flash vessel 60; the rest of the steam being diverted, through conduit 106a and a conduit 304 to secondary clarification stage 300. Valves 306 and 308 in respective conduits 302 and 304 regulate the division of steam between atmospheric flash vessel 60 and secondary clarification stage 300. The use of the steam in secondary clarification stage 300 is described below.

Clarification and separation stage 28a (FIG. 2a) differs from the corresponding and above-described clarification and separation stage 28 (FIG. 1a) in that provisions are also made for pumping brine overflow from thickener 116, by pump 132, back upstream to brine inlet conduit 112, through which brine and suspended solids are flowed into reactor-clarifier 114 from atmospheric flash vessel 60. Provision for recycling the thickener brine overflow is desirable in the event the amount of suspended solids in the thickener overflow becomes excessive. Ordinarily, as shown in FIG. 2b, the thickener overflow is flowed through conduit 144 into reactor-clarifier overflow conduit 142, which, in turn, discharges into secondary clarification stage 300. In this regard, it should be noted that the thickener overflow rate is much smaller than the reactor-clarifier overflow rate. As an illustration, for the exemplary brine extraction rate of about 1.3 million pounds per hour, the reactor-clarifier overflow rate may be about 1.1 million pounds per hour, whereas the thickener overflow rate may be only about 70 thousand pounds per hour. Consequently, the thickener overflow is greatly diluted by the reactor-clarifier overflow and the amount of suspended solids in the thickener overflow (although generally comparable with that of the reactor-clarifier overflow) is usually not critical. Valves 312 and 314 in respective conduits 144 and 310 enable the selection of flow direction of the thickener overflow. It will also be readily appreciated that such provision for thickener overflow recirculation can also be provided in above-described clarification and settling stage 28 to protect filtration and settling stage 30.

Generally comprising secondary brine clarification stage 300 (FIG. 2a) are a closed, secondary clarification vessel 322, a flocculating agent tank 324, a relatively small, high flow rate emergency filter 326, a filter backwash brine holding tank 328 and sludge dewatering means 330, as well as respective flocculating agent, filter, backwash, solids recirculating and dewatering means brine overflow pumps 332, 334, 336, 378 and 340. Secondary clarifier vessel 322, which may be of the known, metallurgical reactor type, is formed having a large internal reaction well 342 in which are mounted, on a vertical shaft 344, two (or more) rotatably driven mixing blades 346. Below a partially open bottom 348 of reaction well 342 are rotatably driven scraper blade means 350.

Clarified brine overflow (which may be termed brine effluent) from reactor-clarifier 114 is flowed, through conduit 142 and a conduit 352, into upper regions of secondary clarifier reaction well 342. Brine overflow from thickener 116 is ordinarily flowed through conduit 144 into conduit 352 to be combined therein with the brine effluent from reactor-clarifier 114. Steam is flowed from low pressure flash crystallizer 58, through conduit 304, into the top of secondary clarifier vessel 322 to provide a steam blanket 356 over a brine surface 358 in the vessel and to exclude air from the vessel, as is considered important to avoid increased brine acidification caused by air oxidation of ferrous ions naturally present in the brine to ferric ions, as mentioned above. Because the steam used to blanket the brine in vessel 322 is obtained in low pressure flash crystallizer 58 from brine being treated in vessel 322, steam-brine compatibility is assured, as is important to prevent upsetting of the secondary clarification process.

A flocculating agent, preferably a cationic polyacrylamide having a molecular weight of at least one and more preferably several million, is fed by pump 332, through conduits 360 and 362, from flocculating agent tank 324 into brine effluent conduit 352. Within conduit 352, the flocculating agent is inter-mixed with the clarified brine before the brine is discharged into secondary clarifier vessel 322. The use of a cationic-type flocculating agent is preferred inasmuch as the silica ions in the suspended silicious material to be flocculated in vessel 322 are negative.

Within secondary clarifier vessel 322, the inflowing brine is naturally circulated down and around reaction well 342 (direction of Arrows A, FIG. 2a), while at the same time mixing blades 346 are rotated (direction of Arrow B) so as to provide good brine-flocculating agent contact within the reaction well. Preferably vessel 322 is sized to provide between about 10 and about 20 minutes of brine residence time in reaction well 342 and a total brine residence time in vessel 322 of between about 45 minutes and about 150 minutes, the more preferred brine residence times being 10 minutes and 45 minutes, respectively, to enable effective flocculating of the fine residual solids suspended in the brine and to permit the settling out of the flocculated material to the bottom of vessel 322.

The secondary clarified brine overflow from vessel 322 is discharged through an overflow conduit 364 to injection pump 156. Preferably the solids content of the secondary clarified brine overflow is less than about 20 parts per million, with mean particle size being between about 3 and about 4 microns. Within vessel 322 the settling solids are raked by means 350 to a solids-brine discharge conduit 366 located at the bottom of the vessel.

For the present, secondary brine clarification process to be economically more attractive then the above-described brine filtering process, good secondary clarification should be achieved with use of only small amounts of flocculating agent. Preferably, considering the high flow rates of geothermal brine involved, less than about two parts per million of flocculating agent in the brine should be used, with a preferred range being between about 0.25 to about 2 parts per million and a more preferred range being between about 0.75 and about 1.25 parts per million. However, it can be appreciated that the very low concentration of solids suspended in the brine to be treated in secondary clarifier vessel 322, as well as the small size of the particles involved (for example, about 150 parts per million of particles having a mean size of about 4 or 5 microns), makes efficient flocculation of the suspended material difficult.

It has, however, been determined by the present inventors that the addition of relatively large amounts of flocculating agent, even if the use of such large amounts were economically practical, does not enhance, but instead tends to inhibit the flocculating rate of solids suspended in the brine within vessel 322. Such inhibiting of flocculation when using large amounts of flocculant is possibly due to mutual repelling of the flocculant ions. Furthermore, the present inventors have determined that greatly increasing the brine-flocculating agent mixing rate, as by greater brine aggitation in reaction well 342, actually reduces the flocculating rate, the increased aggitation apparently causing rupturing of molecular bonds in the long-chain flocculant molecules.

The present inventors have therefore discovered that for the present secondary brine clarification process to be economically practical, it is important to recirculate some of the solids-brine underflow from secondary clarifier vessel 322 back upstream to the inlet of the vessel at a rate maintaining the solids concentration in reaction well 342 within a particular weight percent range. This particular weight percent range is preferably between about 0.5 and about 3 weight percent, with the more preferred weight percent being about 1.5.

Pump 378 is, therefore, connected to discharge conduit 366 for pumping some of the solids-brine slurry or sludge from vessel 322, through a conduit 368, to brine inlet conduit 352. The rest of the slurry from vessel 322 is pumped by pump 378, through a conduit 370, to sludge dewatering means 330. Valves 372 and 374 in respective conduits 368 and 370 control the division of sludge pumped by pump 378 between brine inlet conduit 352 to vessel 322 and dewatering means 330.

Should the concentration of residual solids suspended in the brine overflow from secondary clarifier vessel 322 unexpectedly exceed safe or allowable reinjection limits, the brine overflow from the vessel may be temporarily diverted, through a conduit 380, to pump 334 which then pumps the brine through a conduit 382 into emergency filter 326. After passing through filter 326, the brine is flowed through a conduit 384 back into conduit 364 leading to injection pump 156. Valves 386, 388 and 390 in respective conduits 364, 380 and 384 enable the brine overflow from secondary clarifier vessel 322 to be diverted around (as is the usual case), or alternatively to be flowed through, emergency filter 326. It is to be appreciated that brine overflow from secondary clarifier vessel 322 is flowed through filter 326 only until normal secondary clarification of the brine is reestablished in vessel 322. Consequently, filter 326 is not required to be as extensive as brine filtering stage 30 described above, and which secondary clarification stage 300 of the present invention replaces.

Associated with filter 326 is backwash holding tank 328, which receives brine overflow from vessel 322 through a conduit 392 connected to brine conduit 364. Valve 172 in conduit 364 downstream of conduit 392 and a valve 394 in conduit 392 enable the diverting of brine from injection pump 156 into holding tank 328. To enable filter backwashing, backwash pump 336 pumps brine from holding tank 328 through conduits 396 and 398, as well as through control valve 400 to filter outlet conduit 384 upstream of valve 390.

Secondary clarification stage 300 is importantly "decoupled" from upstream regions of brine handling portion 12a of power plant 10a, except, of course, to the extent that clarified brine from clarification and separation stage 28a is flowed into the secondary clarification stage. That is, no sludge or brine from secondary clarification stage 300 is circulated back upstream, as is done with filtering stage 30 as employed and as described above. As a result, none of the flocculating agent used in the secondary brine clarification process has an opportunity to be carried over into steam produced from the brine, which might cause problems in power generating portion 14. Nor is there any possibility that the flocculating agent can disrupt the silica crystallization process in flash crystallizers 57 and 58, or upset the primary clarification process in reactor-clarifier 114.

Moreover, since neither the filter backwash from filter 326 nor the brine overflow from dewatering means 330 are recirculated upstream of secondary clarification stage 300, the fine particles suspended in the brine from these locations cannot cause problems in the reactor-clarifier, as is often the case when backwash from filtering stage 30 and brine overflow from thickener 116 are recycled into the reactor-clarifier.

Accordingly, filtrate from dewatering means 330 is pumped, by pump 340, through conduits 408 and 410 into clarified brine inlet conduit 352, as shown in FIG. 2b. Similarly, filtrate from filter 326 is pumped, by pump 336, through a conduit 412 and control valve 414 back upstream to brine inlet conduit 352, also as shown in FIG. 2b.

The present invention may be further described with reference to the following example.

EXAMPLE

A side stream of clarified geothermal brine is drawn from the main clarified brine flow from a reactor-clarifier corresponding to reactor-clarifier 114, FIG. 2a. The main flow of clarified brine from the reactor-clarifier is at a rate of about 1.2 million pounds per hour and the side stream flow is at a rate of between about 25,000 and about 100,000 pounds per hour. Composition of the brine in the side stream is about as follows: sodium—60,000 parts per million (PPM), potassium—15,000 PPM, calcium—30,000 PPM, iron (ferrous-)—800 PPM, manganese—900 PPM and silica—350 to 500 PPM. Temperature of the brine in the side stream is about 225° F., and the brine is at atmospheric pressure.

The concentration of suspended solids in the brine side stream is determined over time to vary between about 150 PPM and about 300 PPM, with the average concentration being about 200 PPM. Mean particle size of the particles suspended in the brine side stream is determined to be about 4-5 microns. The brine side stream is flowed into a secondary clarifier vessel corresponding generally to vessel 322 described above.

The suspended particle concentration in the brine overflow from the secondary clarifier vessel is determined, as is mean particle size, for a number of different conditions described below. Duration of the test is about 50 days.

During an initial period of about 5 days, the brine is flowed through the secondary clarifier vessel with no addition of flocculants and without any solids-brine underflow from the vessel being circulated back into the vessel. During this period, the concentration and mean particle size of solid material suspended in the brine overflow from the vessel are determined to be about the same as that of the brine side stream entering the secondary clarifier vessel from the reactor-clarifier.

During a next period of about 14-15 days, the brine flowing through the secondary clarifier vessel is contacted with a cationic polyacrylamide flocculant having a molecular weight of about 16 million, the concentration of the flocculant being varied between about 1.5 PPM and about 3 PPM, the flocculant being diluted with water before introduction into the brine to a concentration of less than about 1 percent to activate the flocculant. However, during this period no solids-brine underflow from the secondary clarifier vessel is recirculated back into the vessel. The concentration of solids suspended in the brine overflow from the vessel is determined to be between about 75 PPM and about 250

PPM, the average concentration being determined to be about 175 PPM.

During about the next and last 28 days of the test, the brine flowing through the secondary clarifier vessel is contacted with the above-mentioned flocculant in concentrations of between about 0.75 PPM and about 1.25 PPM. Also during this period, solids-brine underflow from the secondary clarifier vessel is recirculated back into the vessel at a rate causing the weight percent of solids in the vessel to be between about 1.0 and about 2.0. The concentration of solids suspended in brine overflow from the secondary clarifier vessel is determined to be between about 10 PPM and a peak of about 70 PPM, with the average concentration being between about 20 PPM and about 30 PPM. Mean size of the suspended particles in the brine overflow is determined to be about 4–5 microns.

The results of the testing are plotted in graph form in FIG. 3.

Although there has been described above a preferred embodiment of a process for the secondary clarification of geothermal brine in accordance with the present invention for the purpose of illustrating the manner in which the invention may be used to advantage, it will be appreciated that the invention is not limited thereto. Accordingly, any and all process modifications or variations which may occur to those skilled in the art should be considered to be within the scope of the invention as defined in the appended claims.

What is claimed is:

1. A process for reducing the concentration of residual solids suspended in geothermal brine overflow from a primary brine clarification stage in which a mixture of hot, flashed, silica-rich geothermal brine and suspended siliceous material is separated so as to provide a siliceous sludge and said geothermal brine overflow having a residual amount of solids still remaining suspended therein, and ferrous ions, the process comprising:
   (a) flowing geothermal brine overflow, comprising at most about 300 ppm solids by weihgt, from said primary clarification stage into a secondary clarifier vessel;
   (b) blanketing the geothermal brine overflow from the primary clarification stage in the secondary clarifier vessel with steam in order to prevent oxidation of ferrous ions in the geothermal brine;
   (c) contacting said geothermal brine overflow from the primary brine clarification stage in the secondary clarifier vessel with a flocculating agent;
   (d) discharging from the secondary clarifier vessel an underflow of flocculated solids and brine, and an overflow;
   (e) combining a portion of said underflow of flocculated solids and brine with the geothermal brine overflow from the primary brine clarification stage to provide a preestablished solids concentration in reaction and flocculating regions of the secondary clarifier vessel in which the flocculating agent and brine are contacted;
   (f) discharging from the secondary clarifier vessel a secondarily clarified brine overflow in which the concentration of residual suspended solids is substantially reduced over the concentration of residual solids suspended in the geothermal brine overflow from the primary clarification stage; and
   (g) preventing circulation of the secondary clarifier vessel overflow and the secondary clarifier vessel underflow to the primary brine clarification stage.

2. The process as claimed in claim 1, wherein the secondary clarifier vessel has an internal reaction well, and including introducing the brine overflow from the primary brine clarification stage into said reaction well and contacting the brine with the flocculating agent within the reaction well.

3. The process as claimed in claim 2, including combining an amount of the flocculated solids and brine underflow from the secondary clarifier vessel with the brine overflow from the primary brine clarification stage to provide a solids concentration in said reaction well of between about 0.5 and about 3 weight percent.

4. The process as claimed in claim 3 wherein an amount of the flocculated solids and brine underflow from the secondary clarifier vessel is combined with the brine overflow from the primary clarification stage to provide a solids concentration of about 1.5 weight percent in the reaction well.

5. The process as claimed in claim 1 wherein the secondary clarifier vessel provides a geothermal brine residence time in the vessel of at least about 45 minutes.

6. The process as claimed in claim 5 wherein the vessel provides a brine residence time of between about 45 and about 150 minutes.

7. The process as claimed in claim 1 wherein the step of contacting the geothermal brine overflow from the primary brine clarification stage with a flocculating agent includes adding an amount of flocculating agent to the brine of between about 0.25 and about 2 parts per million.

8. The process as claimed in claim 7 wherein the amount of flocculating agent added to the brine overflow is between about 0.75 and about 1.25 parts per million.

9. The process as claimed in claim 1 including adding the flocculating agent to the brine overflow from the primary brine clarification stage before said brine overflow is introduced into the secondary clarifier vessel.

10. The process as claimed in claim 1 wherein the flocculating agent comprises a cationic polyacrylamide.

11. The process as claimed in claim 10 wherein the flocculating agent has a molecular weight of at least about one million.

12. The process as claimed in claim 11 wherein the molecular weight is at least about 16 million.

13. A process for reducing the concentration of fine, residual, siliceous particles suspended in geothermal brine overflow from a primary brine clarification stage in which hot, flashed, silica-rich geothermal brine having siliceous matter suspended therein is clarified to provide said geothermal brine overlow having a residual amount of fine siliceous particles still remaining suspended therein, and ferrous ions, the process comprising:
   (a) flowing into a reaction well of a secondary clarifier vessel said geothermal brine overflow from the primary brine clarification stage, said geothermal brine overflow comprising at most about 300 ppm solids by weight;
   (b) blanketing the geothermal brine overflow in the secondary clarifier vessel with steam in order to prevent oxidation of ferrous ions in the geothermal brine;
   (c) contacting, within said reaction well, the geothermal brine from the primary clarification stage with between about 0.25 and about 2 parts per million of a flocculating agent;

(d) discharging from the secondary clarifier vessel an underflow slurry of flocculated solids and brine;

(e) recirculating an amount of said underflow slurry from the secondary clarifier vessel back into said secondary clarifier reaction well causing the weight percent of solids in the reaction well to be between about 0.5 and about 3;

(f) discharging from the secondary clarifier vessel a secondarily clarified brine overflow having a suspended residual siliceous particle concentration which is substantially reduced over the suspended siliceous particle concentration in the brine overflow from the primary brine clarification stage; and (g) preventing circulation of the secondarily clarifed brine overflow and the secondary clarified brine overflow and the secondary clarifier vessel underflow slurry to the primary brine clarification stage.

14. The process as claimed in claim 13 wherein the steam blanketing step comprises flowing into the secondary clarifier vessel steam obtained from a flashing of geothermal brine.

15. The process as claimed in claim 13 wherein the brine overflow from the primary brine clarification stage is contacted with between about 0.75 and about 1.25 parts per million of flocculating agent.

16. The process as claimed in claim 13 wherein the flocculating agent is combined with the brine overflow from the primary brine clarification stage before said brine overflow is received into said reaction well.

17. The process as claimed in claim 13 wherein an amount of said underflow slurry is recirculated into the reaction well causing the weight percent of solids in the reaction well to be about 1.5.

18. The process as claimed in claim 13 wherein the concentration of residual siliceous particles suspended in the brine overflow from the primary brine clarification stage is between about 100 and about 300 parts per million and wherein the concentration of residual siliceous particles suspended in the secondarily clarified brine overflow is between about 5 and about 50 parts per million.

19. The process as claimed in claim 13 wherein the flocculating agent comprises a cationic polyacrylamide having a molecular weight of at least about 1 million.

20. The process as claimed in claim 13 wherein the secondary clarifier vessel is constructed to provide a brine residence time of between about 45 and about 150 minutes therein.

21. A process for reducing the concentration of fine, residual, siliceous particles suspended in geothermal brine overflow from a primary brine clarification stage in which hot, flashed geothermal brine having siliceous matter suspended therein is clarified to provide said geothermal brine overflow having a residual amount of fine, siliceous particles still remaining suspended therein, and ferrous ions, the process comprising:

(a) flowing into a reaction well of a secondary clarifier vessel said geothermal brine overflow from the primary brine clarification stage, said geothermal brine overflow from the primary clarification stage comprising at most about 300 ppm solids by weight, said vessel providing a brine residence time therein of between about 45 and about 150 minutes;

(b) blanketing the geothermal brine in the secondary clarifier vessel with steam obtained from a flashing of geothermal brine in order to prevent oxidation of ferrous ions in the geothermal brine;

(c) contacting, within the reaction well, the geothermal brine overflow from the primary brine clarification stage with between about 0.25 and about 2 parts per million of a flocculating agent having a molecular weight of at least about one million;

(d) discharging from the secondary clarifier vessel an underflow slurry of flocculated solids and brine and recirculating an amount of said underflow slurry back into the reaction well causing the solids concentration in the reaction well to be between about 0.5 and about 3 weight percent;

(e) discharging from the secondary clarifier vessel a brine overflow having a residual suspended siliceous particle concentration which is substantially reduced over the residual siliceous particle concentration in the brine overflow from the primary brine clarification on stage; and (f) preventing circulation of the secondary clarified brine overflow and underflow slurry to the primary brine clarification stage.

22. The process as claimed in claim 21 wherein the flocculating agent comprises a cationic polyacrylamide.

23. The process as claimed in claim 21 wherein the reaction well provides a brine residence time therein of between about 10 and about 20 minutes.

* * * * *